United States Patent [19]
Da et al.

[11] Patent Number: 5,346,027
[45] Date of Patent: Sep. 13, 1994

[54] WALKING TRUCK

[76] Inventors: Huang Y. Da; Huang Y. Fong, both of No. 2-2, Fu Hsing, Fu Hsing Li, Tung Hsiao Town, Miaoli Hsien, Taiwan

[21] Appl. No.: 95,173

[22] Filed: Jul. 21, 1993

[51] Int. Cl.$^5$ .................................................. B62B 5/02
[52] U.S. Cl. ........................................ 180/8.2; 180/8.6; 180/41; 280/840
[58] Field of Search ............. 180/8.2, 8.6, 8.1, 8.3, 180/8.5, 41, 901; 280/840, DIG. 10, 5.2, 5.28

[56] References Cited

U.S. PATENT DOCUMENTS

| | | | |
|---|---|---|---|
| 3,034,591 | 5/1962 | Bell | 180/8.6 |
| 3,760,897 | 9/1973 | Reynolds | 180/8.2 |
| 4,566,707 | 1/1986 | Nitzberg | 180/8.2 |

FOREIGN PATENT DOCUMENTS

| | | | |
|---|---|---|---|
| 0145282 | 6/1989 | Japan | 180/8.2 |
| 0868033 | 5/1961 | United Kingdom | 180/8.3 |

*Primary Examiner*—Margaret A. Focarino
*Assistant Examiner*—Anne Marie Boehler

[57] ABSTRACT

A walking truck including a platform pivotably supported above a base frame, inner racks and outer racks bilaterally disposed below the base frame and coupled by transmission shafts and cranks, a first motor drive controlled to move the inner racks and the outer racks alternatively for going upstairs or downstairs, a second motor drive controlled by a pendulum and two micro switches to move a balance linkage in either direction for keeping the platform in balance as the walking truck goes upstairs or downstairs.

1 Claim, 7 Drawing Sheets

WALKING TRUCK

BACKGROUND OF THE INVENTION

The present invention relates to trucks, and more particularly to a walking truck specifically designed for carrying things over steps.

Various push cars are manufactured and widely used in factories, warehouses, etc. for carrying things within a short distance. These trucks generally are comprised of a platform supported on wheels that can be conveniently moved with the hands to carry heavy loads from place to place on the plain. However, these conventional hand trucks are not suitable for carrying loads upstairs or downstairs. While going upstairs or downstairs, much labor is needed to move the hand truck and the loads thereon over the obstacle.

SUMMARY OF THE INVENTION

The present invention has been accomplished under the aforesaid circumstances. It is therefore an object of the present invention to provide a walking truck which can be moved on the plain as well as over steps with less labor. It is another object of the present invention to provide a walking truck which keeps the loads constantly in a horizontal balanced manner as it is moved over steps.

According to one aspect of the present invention, the walking truck comprises a platform horizontally balanced on a base frame, a pair of inner racks and a pair of outer racks disposed below the base frame and operated by a first motor drive through transmission shafts and cranks to move over steps.

According to another aspect of the present invention, the platform is controlled in balance by a balance linkage, which is operated by a second motor drive, in either direction controlled by two micro switches being alternatively triggered by a pendulum.

DETAILED DESCRIPTION OF THE PREFERRED EMBODIMENT

Figure 1:
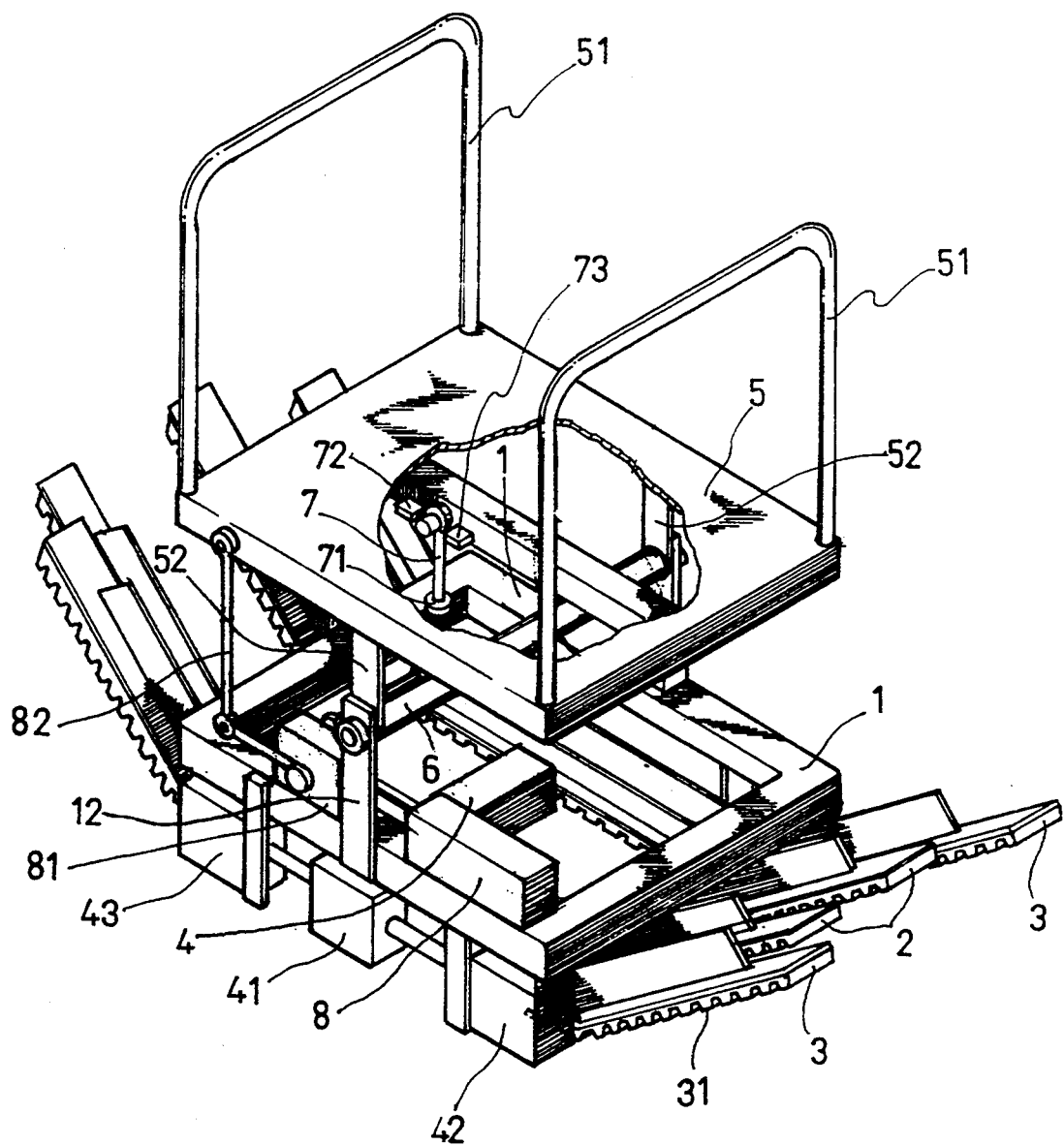
FIG. 1 is a perspective and partial broken view of a walking truck according to the preferred embodiment of the present invention.
Figure 2:
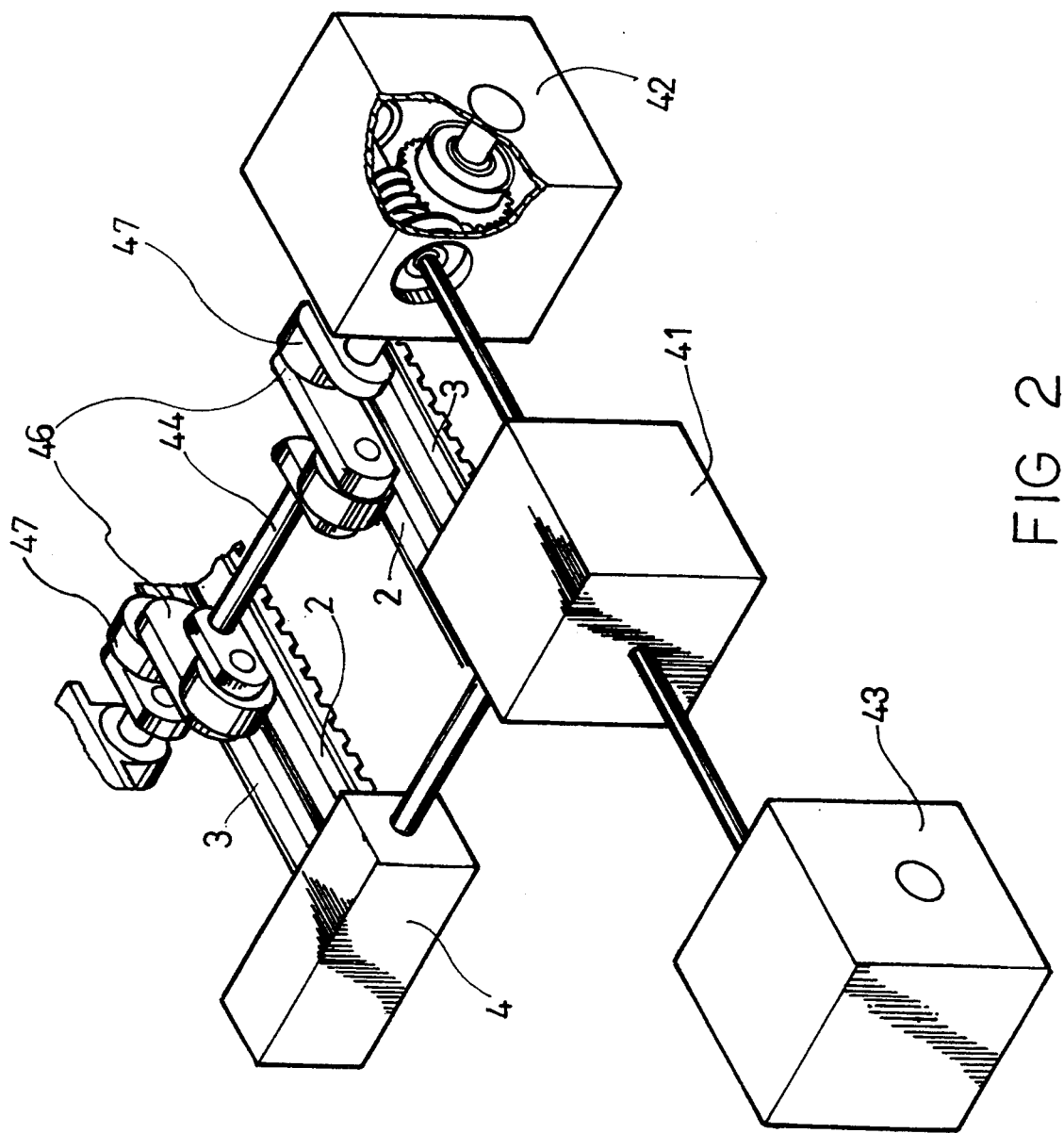
FIG. 2 is a partial enlarged view of the walking truck showing the inner and outer racks coupled to the first motor drive by cranks.
Figure 3:
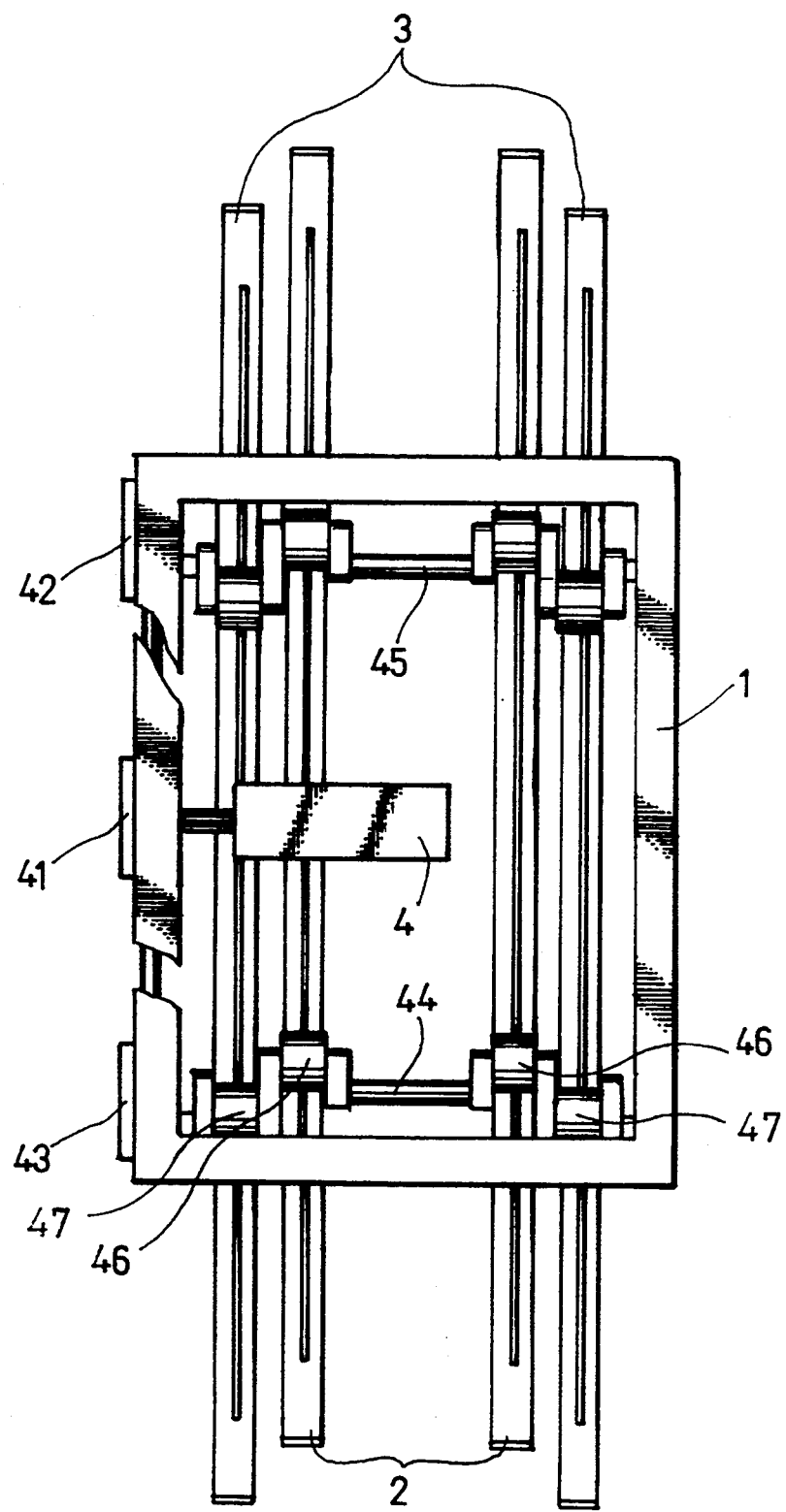
FIG. 3 is a top view of the base frame and the inner and outer racks.
Figure 4:
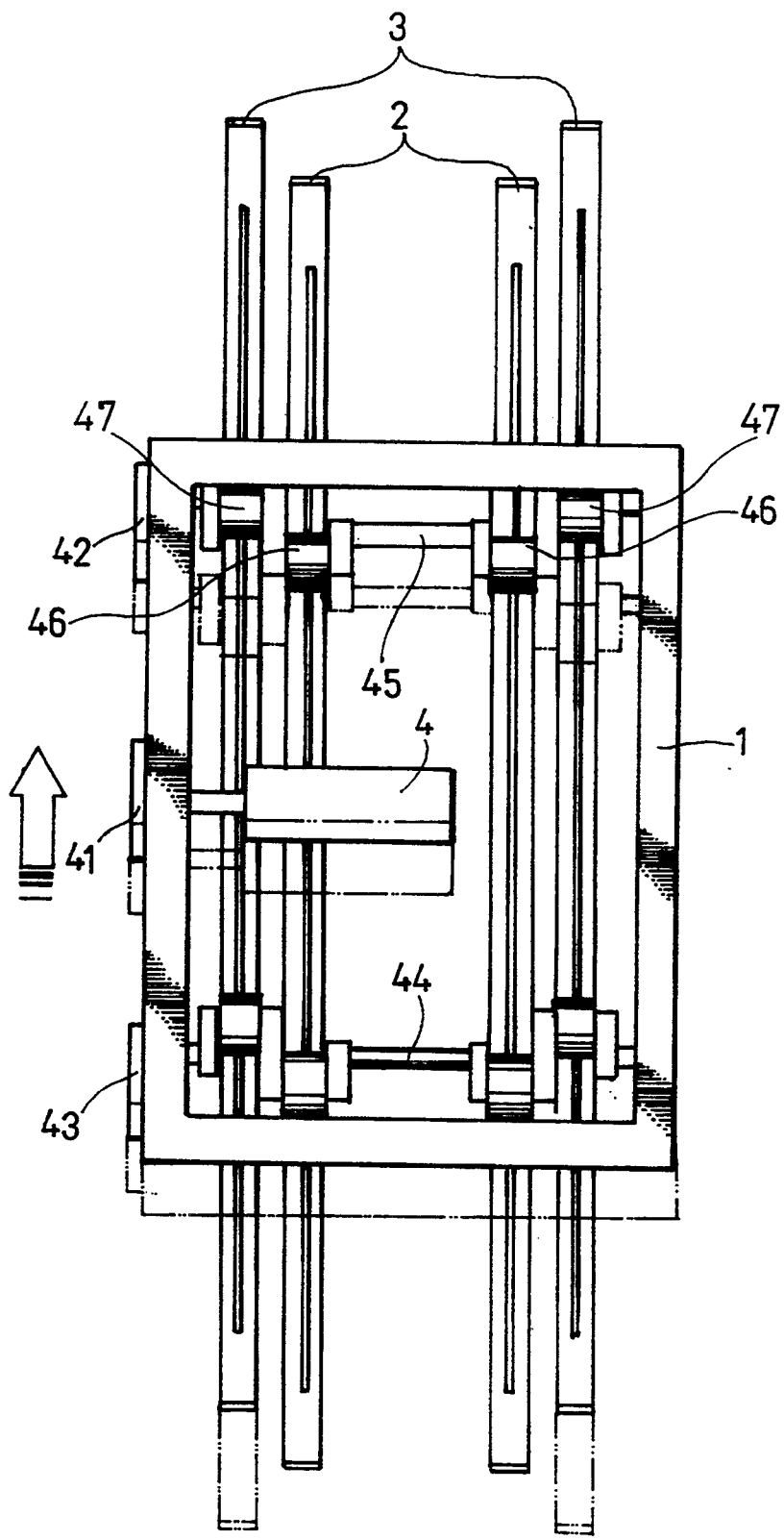
FIG. 4 is similar to FIG. 3 but showing the inner racks and the outer racks alternatively moved forward.

Turning now to the annexed drawings in detail and referring first to FIGS. 1, 2, 3 and 4, a walking truck in accordance with the preferred embodiment of the present invention is generally comprised of a base frame 1, a pair of inner racks 2, a pair of outer racks 3, a first motor drive 4, a platform 5, a pivot 6, a pendulum 7, and a second motor drive 8. The inner racks 2 are bilaterally disposed in parallel at the bottom of the base frame 1. The outer racks 3 are bilaterally disposed outside the inner racks 2. Each rack has two opposite ends obliquely extended upwardly out of the base frame 1. The inner racks 2 are joined by two pairs of synchronized inner cranks 46 disposed on two spaced transverse crank shafts 44, 45 and respectively coupled to the outer racks 3 by the synchronized outer cranks 47, which are 180° opposite to the inner cranks 46. The first motor drive 4 comprises a drive gear box 41 in the middle, and two driven gear boxes 42;43 at two opposite sides by the drive gear box 41 and respectively coupled to the transverse crank shafts 44;45. The driven gear boxes 42;43 are driven by the drive gear box 41 to turn the transverse crank shafts 44;45 synchronously, as the first motor drive 4 is turned on, causing the cranks 46 and 47 to move the inner racks 2 and the outer racks 3 alternatively.

Figure 5:
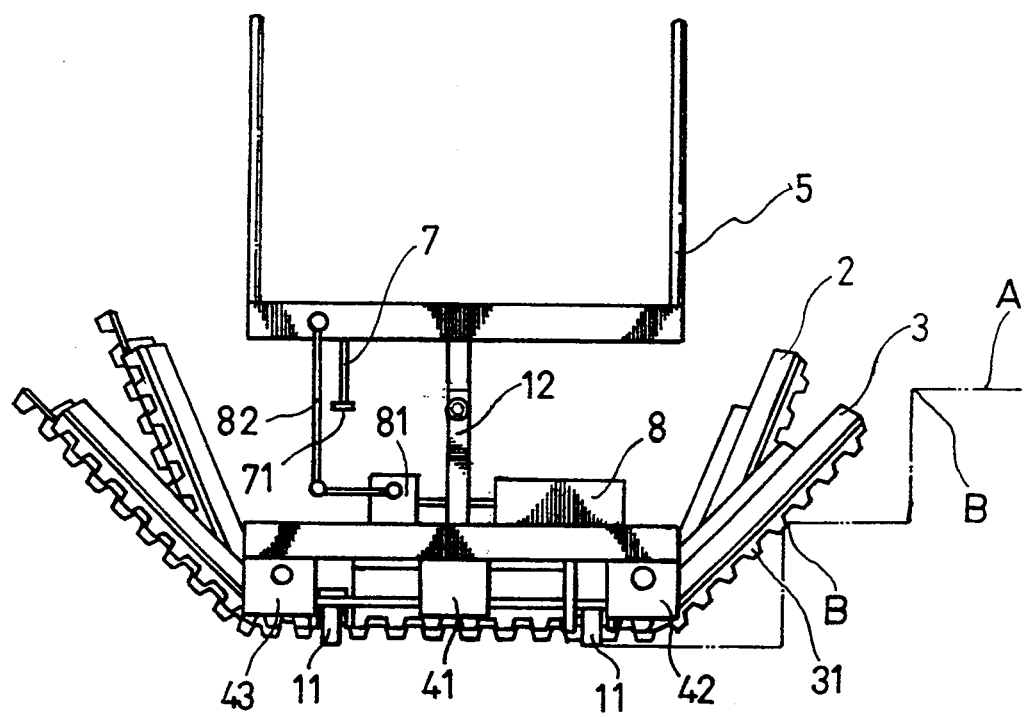
FIG. 5 shows the walking truck moved to go upstairs (step I)
Figure 6:
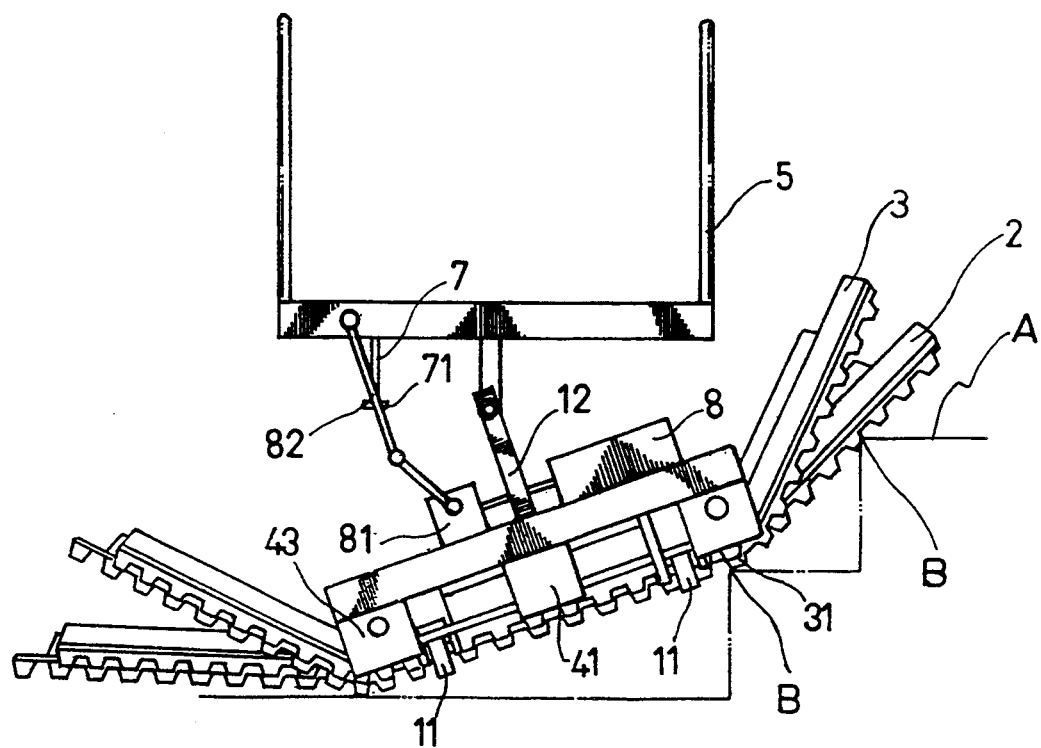
FIG. 6 shows the walking truck moved to go upstairs (step II)
Figure 7:
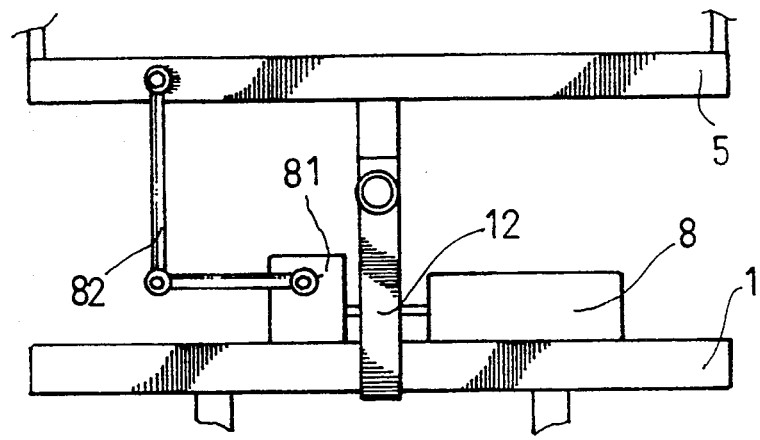
FIG. 7 is a partial side view of the walking truck showing the platform supported above the base frame and balanced by the balance linkage being coupled to the second motor drive.
Figure 8:
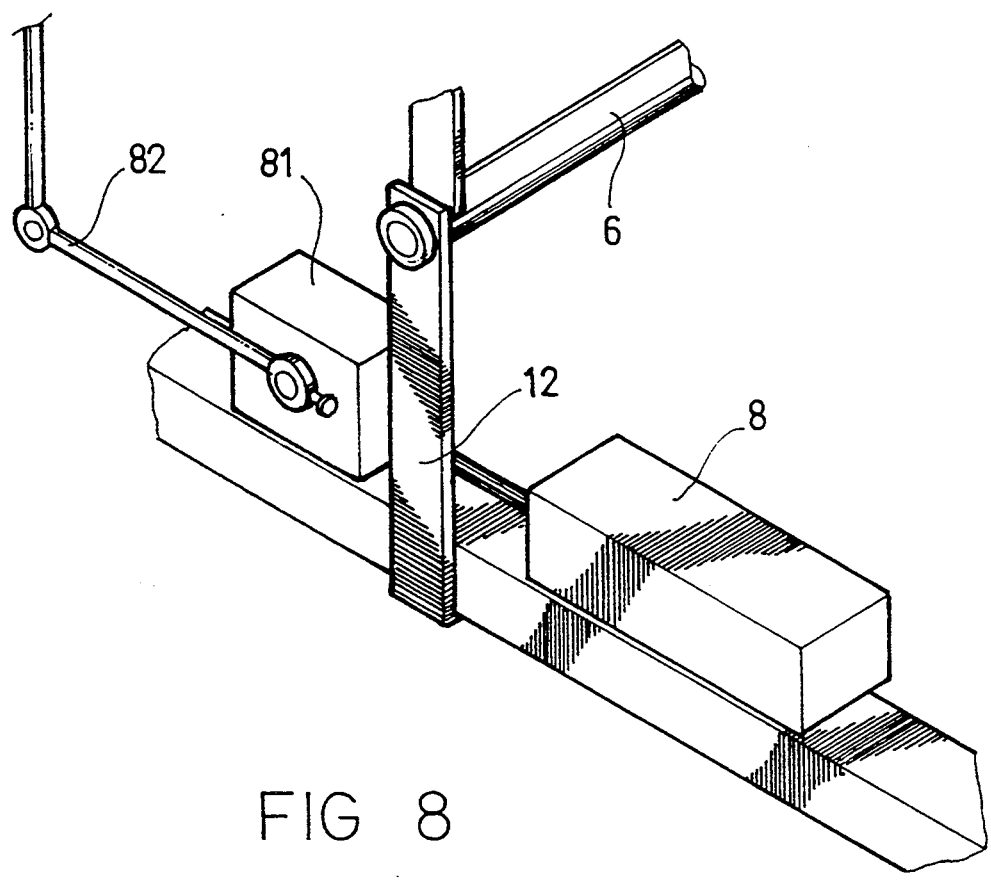
FIG. 8 is a partial enlarged view showing the balance linkage coupled to the transmission gear box.
Figure 9:
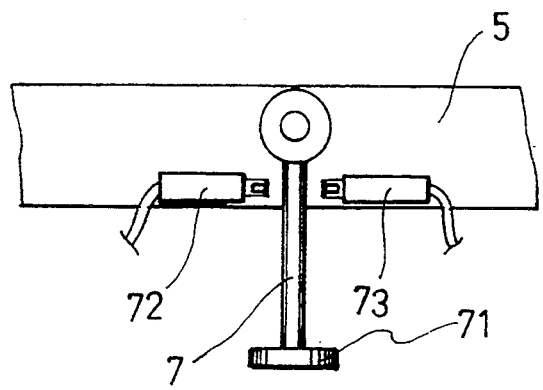
FIG. 9 illustrates the positions of the micro switches and the pendulum on the platform.
Figure 10:
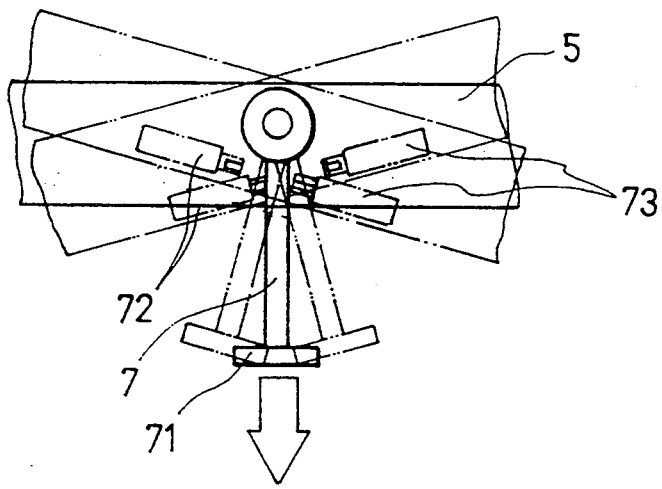
FIG. 10 shows the pendulum oscillated to trigger either micro switch.
Figure 11:
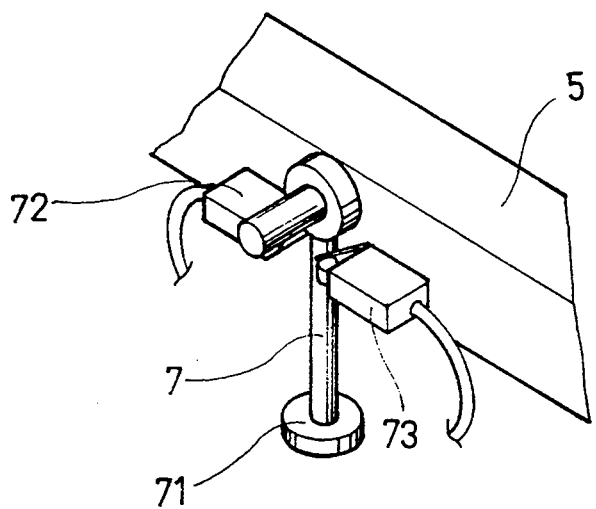
FIG. 11 illustrates one micro switch triggered by the pendulum as the platform is tilted.

Referring to FIGS. 5 and 6, the inner and outer racks 2;3 have teeth 21;31 transversely spaced along the respective bottom. While moving over steps, the teeth 21 (or 31) of the inner racks 2 (or outer racks 3) are engaged with the nosing B of the adjacent step, then the outer racks 3 (or inner racks 2) are turned upwardly forward to engage with the nosing B of a higher step, and then the inner racks 2 (or outer racks 3) are turned upwardly forward to engage with the nosing B of a further higher step. Repeating the aforesaid procedure, the walking truck conveniently moves to the landing step A. By controlling the revolving direction of the reversible motor (not shown) of the first motor drive 4, the racks 2;3 are alternatively moved forward to go upstairs, or backward to go downstairs. Further, rollers 11 are fastened to the base frame 1 at the bottom and disposed at right angles relative to the racks 2;3 for moving the walking truck on a flat surface in the direction perpendicular to the longitude of the racks 2;3.

Referring to FIGS. 7 through 10 and FIG. 1 again, rails 51 may be made on the platform 5 at the top to guard the load. Two upright supports 12 are bilaterally fastened to the base frame 1 in the middle to support the pivot 6 for horizontal balance of platform 5. The platform 5 is pivotably mounted on the pivot 6 by two legs 52. The pendulum 7 is fastened to the platform 5 at the bottom. The bottom end of the pendulum 7 is coupled with a weight 71. Two micro switches 72;73 are disposed at two opposite sides by the pendulum 7 for controlling the forward and backward running of the second motor drive 8 respectively. The second motor drive 8 comprises a transmission gear box 81 coupled to a balance linkage 82. As the walking truck moves over steps (see FIGS. 5 and 6 again), the second motor drive 8 is controlled by the micro switches 72;73 to move the balance linkage 82, so as to constantly keep the platform 5 in a horizontal balanced manner.

As indicated, the present invention provides a walking truck which is practical for use to carry load over steps. Of course, a conventional electric circuit with a control switch is needed to control the operation of the first and second motor drives. In practice, a load of more than 200 kgs can be easily carried by the walking truck upstairs as well as downstairs.

While only one embodiment of the present invention has been shown and described, it will be understood that various modifications and changes could be made without departing from the spirit and scope of the invention.

What is claimed is:

1. A walking truck comprising:
   a base frame having a several pairs of rollers symmetrically disposed at the bottom, a pair of upright supports bilaterially disposed at a top surface of said base frame, a horizontal pivot supported between said upright supports;
   a pair of inner racks joined by transmission axles and cranks and bilaterially disposed under said base frame at right angles relative to said rollers, each inner rack having a toothed bottom wall and two opposite ends respectively and obliquely extended out of said base frame;
   a pair of outer racks bilaterially disposed outside said inner racks under said base frame and respectively coupled to said inner racks by said cranks, each outer rack having a toothed bottom wall and two opposite ends respectively and obliquely extended out of said base frame;
   a first motor drive comprising a first reversible motor, a drive gear box coupled to by said first reversible motor, and two driven gear boxes are driven by said drive gear box to turn said transmission axles and said cranks in moving said inner racks and said outer racks alternatively for going upstairs or downstairs;
   a platform pivotably mounted on said horizontal pivot, said platform having a pendulum at the bottom and two micro switches disposed on two opposite sides by said pendulum;
   a balance linkage connected to said platform and moved to constantly hold said platform in a horizontal balanced manner; and
   a second motor drive mounted on said base frame, said second motor drive having an output shaft coupled to said balance linkage and being controlled by said micro switches to move said balance linkage in either direction in keeping said platform in balance.

* * * * *